(12) United States Patent
Fujimoto

(10) Patent No.: US 9,720,397 B2
(45) Date of Patent: Aug. 1, 2017

(54) MACHINE TOOL HAVING WARMING-UP FUNCTION

(71) Applicant: FANUC Corporation, Yamanashi (JP)

(72) Inventor: Taisei Fujimoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 258 days.

(21) Appl. No.: 14/711,367

(22) Filed: May 13, 2015

(65) Prior Publication Data
US 2015/0338841 A1    Nov. 26, 2015

(30) Foreign Application Priority Data

May 26, 2014 (JP) ................................. 2014-107857

(51) Int. Cl.
| | | |
|---|---|---|
| *G05B 19/401* | (2006.01) | |
| *B23Q 17/00* | (2006.01) | |
| *G05B 19/404* | (2006.01) | |

(52) U.S. Cl.
CPC .......... *G05B 19/401* (2013.01); *B23Q 17/00* (2013.01); *G05B 19/404* (2013.01); *G05B 2219/37428* (2013.01); *G05B 2219/49057* (2013.01); *G05B 2219/49123* (2013.01); *G05B 2219/49206* (2013.01)

(58) Field of Classification Search
CPC ................ G05B 19/401; G05B 19/404; G05B 2219/49206; G05B 2219/49123; G05B 2219/37428; G05B 2219/49057; B23Q 17/00
See application file for complete search history.

(56) References Cited

U.S. PATENT DOCUMENTS

| | | | | | |
|---|---|---|---|---|---|
| 4,399,789 | A | * | 8/1983 | Yano | F02D 31/005 123/339.11 |
| 4,837,713 | A | * | 6/1989 | Tahara | G03D 13/006 392/462 |
| 5,483,464 | A | * | 1/1996 | Song | G06F 1/3215 307/38 |
| 7,997,385 | B2 | * | 8/2011 | Yanohara | F16C 33/6625 184/104.1 |
| 9,235,199 | B2 | * | 1/2016 | Fujii | G05B 19/404 |

(Continued)

FOREIGN PATENT DOCUMENTS

| | | |
|---|---|---|
| JP | 61-065735 A | 4/1986 |
| JP | 61-65753 A | 4/1986 |

(Continued)

OTHER PUBLICATIONS

Office Action mailed Oct. 27, 2015, corresponding to Japanese Patent Application No. 2014-107857.

*Primary Examiner* — Ramesh Patel
(74) *Attorney, Agent, or Firm* — Hauptman Ham, LLP

(57) ABSTRACT

When warm-up operation is started, a machine tool acquires an atmospheric temperature around the machine tool and selects a warm-up operation program on the basis of the acquired atmospheric temperature. A warm-up operation command suitable for the atmospheric temperature is given to the control unit according to the selected warm-up operation program. A movable unit of the machine tool can be thereby controlled, and optimum warm-up operation for the atmospheric temperature can be eventually performed.

6 Claims, 9 Drawing Sheets

(56) References Cited

U.S. PATENT DOCUMENTS

| | | | |
|---|---|---|---|
| 2006/0089742 A1* | 4/2006 | Jalluri | G05B 19/4065 700/159 |
| 2006/0089744 A1* | 4/2006 | Jalluri | G05B 19/4065 700/174 |
| 2007/0213867 A1* | 9/2007 | Prust | B23Q 11/0007 700/193 |
| 2008/0083585 A1* | 4/2008 | Yanohara | F16C 33/6625 184/6.1 |
| 2010/0145499 A1* | 6/2010 | Sato | B23Q 11/0003 700/193 |
| 2013/0211598 A1* | 8/2013 | Fujii | G05B 19/404 700/275 |

FOREIGN PATENT DOCUMENTS

| | | |
|---|---|---|
| JP | 2005-34929 A | 2/2005 |
| JP | 2008-93738 A1 | 4/2008 |
| JP | 2009-113138 A | 5/2009 |
| JP | 2009-142919 A | 7/2009 |
| JP | 2013-163255 A | 8/2013 |

\* cited by examiner

MACHINE TOOL HAVING WARMING-UP FUNCTION

RELATED APPLICATIONS

The present application claims priority to Japanese Application Number 2014-107857, filed May 26, 2014, the disclosure of which is hereby incorporated by reference herein in its entirety.

BACKGROUND OF THE INVENTION

Field of the Invention

The present invention relates to a machine tool having a warming-up function, and specifically, relates to a machine tool controlling warm-up operation on the basis of external factors such as atmospheric temperature and atmospheric humidity.

Description of the Related Art

A machine tool machines a workpiece by operating rotation drive means such as a spindle motor, in a situation where heat is generated from the rotation drive means itself or portions operating with the rotation drive means. Therefore, when the machining is started without preparation in the state where the machine tool is still cold, thermal displacement on the shafts and the like arises in response to temperature elevation caused by the generated heat. Thus, displacement in relative position between the workpiece and a tool arises, which problematically causes deterioration of machining precision.

A typical technique to handle such deterioration of machining precision due to the thermal displacement is warm-up operation. In the warm-up operation, an idle operation is performed in advance until the temperature of a machine tool saturates, before starting actual machining work, when power supply of the machine tool is turned on. Machining of a workpiece is not started until thermal displacement in portions such as a spindle is stabilized by the warm-up operation, as a result, the machining precision can be stabilized. As conventional technologies of machine tools performing such warm-up operation, for example, techniques disclosed in Japanese Patent Application Laid-Open No. 61-065735, Japanese Patent Application Laid-Open No. 2009-113138, Japanese Patent Application Laid-Open No. 2013-163255, and so on are proposed.

In view of scheduling of machining, warm-up operation of machine tools is desirable to be performed within a predetermined minimum necessary time. Nevertheless, the time of warm-up operation required for saturation of the temperature of the machine tool problematically changes depending on external factors such as atmospheric temperature in the place where the machine tool is installed.

In such an environment where the atmospheric temperature changes, when a technology on the warm-up operation of machine tools which executes a single warm-up operation program for a certain period, for example, as disclosed in Japanese Patent Application Laid-Open No. 61-065735, is applied, the time required for warm-up operation is set. However, this disadvantageously results in excess warm-up operation in case where, for example, atmospheric temperature is high. Moreover, according to technologies on warm-up operation of machine tools as disclosed in Japanese Patent Application Laid-Open No. 2009-113138 and Japanese Patent Application Laid-Open No. 2013-163255, a technique of continuously measuring the thermal displacement in a machine tool to determine whether to continue the warm-up operation can be adopted. Although such a technique can execute control so as not to perform an excess warm-up operation, how long the warm-up operation has to be performed is not apparent when the warm-up operation is started. Hence, an operator cannot predict the end time of the warm-up operation.

SUMMARY OF THE INVENTION

Therefore, in view of the above-mentioned problems with the conventional technologies, an object of the present invention to provide a machine tool performing warm-up operation compatible with external factors of the machine tool which factors are measured at a time of starting the warm-up operation under the circumstances in which the external factors of the machine tool such as atmospheric temperature and atmospheric humidity possibly change.

The present invention relates to a machine tool having a warming-up function of driving a movable unit of the machine tool to perform warm up.

There is provided a machine tool according to a first aspect having the warming-up function, the machine tool including: a control unit that controls the movable unit; a temperature measurement unit that measures an atmospheric temperature around the machine tool; a program storage unit that stores a plurality of warm-up operation programs in association with the atmospheric temperature; and a warm-up operation command unit that selects one warm-up operation program from among the warm-up operation programs stored in the program storage unit on the basis of the atmospheric temperature measured by the temperature measurement unit, and gives a command of warm-up operation to the control unit on the basis of the selected warm-up operation program. The control unit controls the movable unit on the basis of the command from the warm-up operation command unit.

The machine tool may further include a humidity measurement unit that measures an atmospheric humidity around the machine tool, the program storage unit may store the plurality of warm-up operation programs in association with the atmospheric temperature and the atmospheric humidity, and the warm-up operation command unit may be configured to select the warm-up operation program from among the warm-up operation programs stored in the program storage unit on the basis of the atmospheric temperature measured by the temperature measurement unit and the atmospheric humidity measured by the humidity measurement unit.

There is provided a machine tool according to a second aspect having the warming-up function, the machine tool including: a control unit that controls the movable unit; a temperature measurement unit that measures an atmospheric temperature around the machine tool; a program storage unit that stores a warm-up operation program including a parameter that can change a warm-up operation period; and a warm-up operation command unit that changes the parameter on the basis of the atmospheric temperature measured by the temperature measurement unit, and gives a command of warm-up operation to the control unit on the basis of the warm-up operation program in which the parameter is changed. The control unit controls the movable unit on the basis of the command from the warm-up operation command unit.

The machine tool may further include a humidity measurement unit that measures an atmospheric humidity around the machine tool, and the warm-up operation command unit may be configured to change the parameter on the basis of the atmospheric temperature measured by the temperature measurement unit and the atmospheric humidity measured by the humidity measurement unit.

The temperature measurement unit may be configured to automatically start to measure the atmospheric temperature when power supply to the machine tool is performed.

The temperature measurement unit and the humidity measurement unit may be configured to automatically start to measure the atmospheric temperature and the atmospheric humidity, respectively, when power supply to the machine tool is performed.

According to the present invention, a warm-up operation program is selected which is compatible with external factors of the machine tool such as atmospheric temperature and atmospheric humidity measured at a time of starting warm-up operation, from among a plurality of warm-up operation programs associated with the external factors of the machine tool such as the atmospheric temperature and the atmospheric humidity, to execute the selected warm-up operation program. Accordingly, the machine tool which performs an optimum warm-up operation for external factors can be provided. Moreover, parameters included in a warm-up operation program are adjusted based on external factors of the machine tool such as atmospheric temperature and atmospheric humidity measures at a time of starting warm-up operation to execute the warm-up operation program. Accordingly, the machine tool which performs an optimum warm-up operation for external factors can be provided.

As above, since operation control of warm-up operation is determined at a time of starting the warm-up operation, an operator can grasp the end time of the warm-up operation in advance.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

Figure 1:
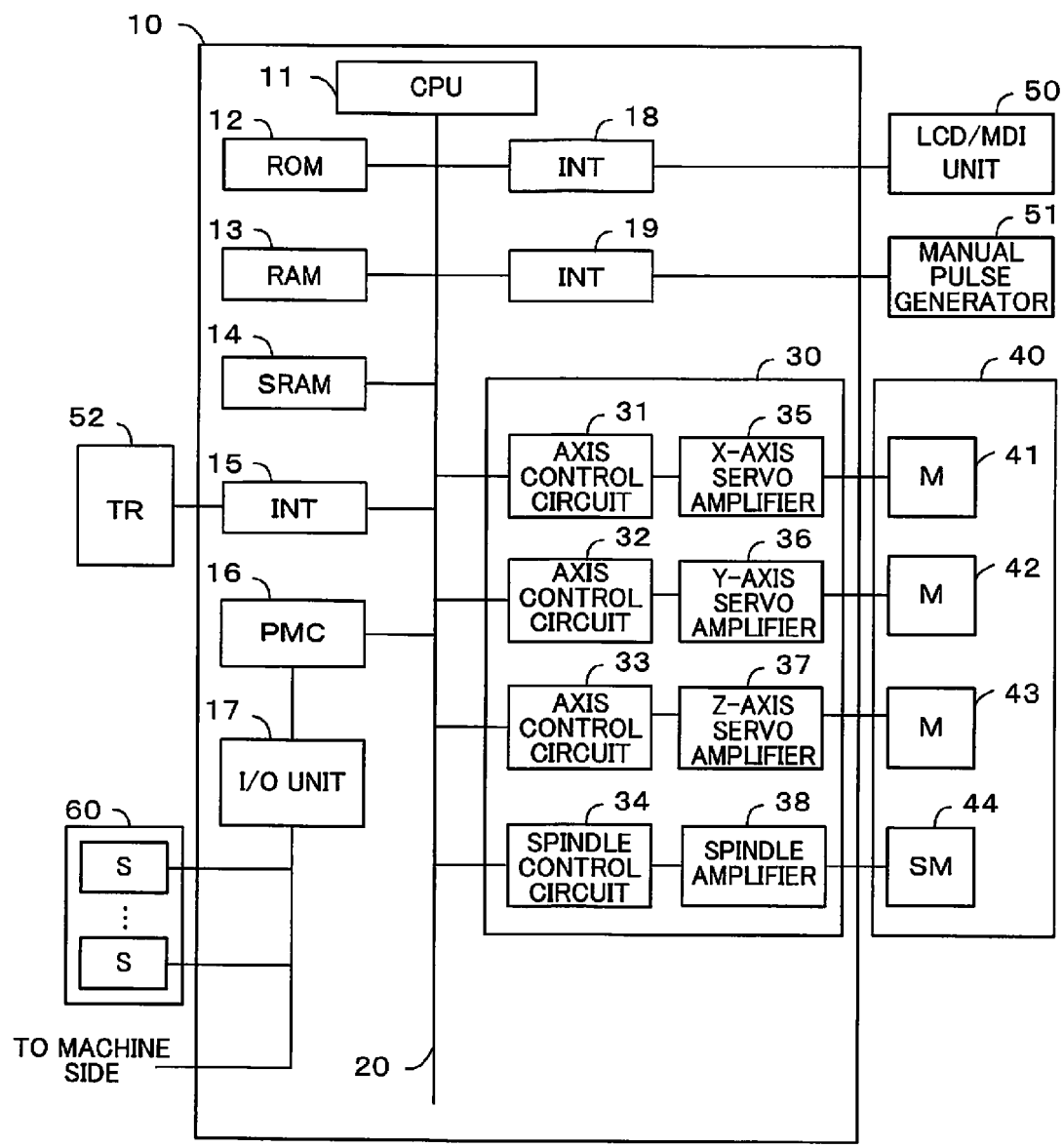
FIG. 1 is a hardware configuration diagram of a machine tool according to the present invention.

FIG. 1 is a hardware configuration diagram illustrating the essential part of a machine tool.

A machine tool 1 includes a numerical controller 10 controlling operation of the machine tool 1. A processor (CPU) 11 of the numerical controller 10 reads a system program stored in a ROM 12 via a bus 20 and totally controls the numerical controller 10 according to the system program. A RAM 13 stores temporary calculation data and display data, various kinds of data inputted by an operator via an LCD/MDI unit 50, and the like.

An SRAM 14 is backed up with a battery (not shown) and is configured as a non-volatile memory which retains its memory state even when power supply of the numerical controller 10 is turned off. The SRAM 14 stores a program for measuring an initial position, a program for performing thermal displacement compensation of the machine tool 1, a machining program mentioned later which is read via an interface 15, a machining program inputted via the LCD/MDI unit 50, and the like. Moreover, in a ROM 12, various system programs for performing processing for automatic operation and processing of an edit mode required for creating and editing the machining programs are written in advance.

The interface 15 is an interface for an external device connectable to the numerical controller 10, and an external device 52 such as an external storage apparatus is connected thereto. The machining programs, a thermal displacement measurement program, and the like are read from the external storage apparatus. A PMC (programmable machine controller) 16 controls auxiliary apparatuses and the like of the machine tool 1 with sequence programs stored in the numerical controller 10. More specifically, according to M-functions, S-functions and T-functions as commands given by the machining program, the sequence programs convert signals necessary in the auxiliary apparatuses side to output them to the auxiliary apparatuses side from an I/O unit 17. With the output signals, the auxiliary apparatuses such as various actuators operate. Moreover, the PMC receives signals of various switches and the like of an operation panel disposed on the machine tool 1, and signals of various sensors 60 which are disposed in the vicinity of the machine tool 1 and measure atmospheric temperature and the like, executes necessary processing, and delivers those signals to the processor 11.

Image signals of current positions of the axes of the machine tool 1, alarming, parameters, image data and the like are sent to the LCD/MDI unit 50 and displayed on its display. The LCD/MDI unit 50 is a manual data input apparatus including a display, a keyboard and the like. An interface 18 receives data from the keyboard of the LCD/MDI unit 50 and delivers the data to the processor 11.

An interface 19 is connected to a manual pulse generator 51. The manual pulse generator 51 is implemented on the operation panel of the machine tool 1 and is used for precisely positioning a movable unit of the machine tool 1 on the basis of control of the axes with distribution pulses based on manual operation.

A control unit 30 controlling drive of the individual parts of the machine tool 1 includes control circuits 31 to 33 of the X-, Y- and Z-axes which move a table T of the machine tool 1, a spindle control circuit 34 causing a spindle to rotate, servo amplifiers 35 to 37 driving servo motors 41 to 43 of the axes upon reception of commands from the control circuits 31 to 33 of the axes, a spindle amplifier 38 driving a spindle motor 44 upon reception of commands from the spindle control circuit 34 and the like. Moreover, the movable unit 40 of the machine tool 1 includes the servo motors 41 to 43 of the axes which drive the table T, the spindle motor 44 driving the spindle and the like.

The control circuits 31 to 33 of the X-, Y- and Z-axes which move the table T of the machine tool 1 receive motion commands of the axes from the processor 11 and output the commands of the axes to the servo amplifiers 35 to 37. The servo amplifiers 35 to 37 receive the commands to drive the servo motors 41 to 43 of the axes of the machine tool 1. The servo motors 41 to 43 of the axes include position detectors therein. Position signals from the position detectors are fed back as a pulse train.

The spindle control circuit 34 receives a spindle rotation command to the machine tool 1 and outputs a spindle speed signal to the spindle amplifier 38. The spindle amplifier 38 receives the spindle speed signal and causes the spindle motor 44 of the machine tool 1 to rotate at the commanded rotational speed, and thereby, drives a tool. A position detector is joined to the spindle motor 44 with gears, belts or the like and outputs a feedback pulse in synchronization with the rotation of the spindle for this position detector, which pulse is fed back to the numerical controller 10 side.

Hereafter, embodiments of the machine tool, according to the present invention, which includes the configuration illustrated in FIG. 1 are described.

Figure 2:
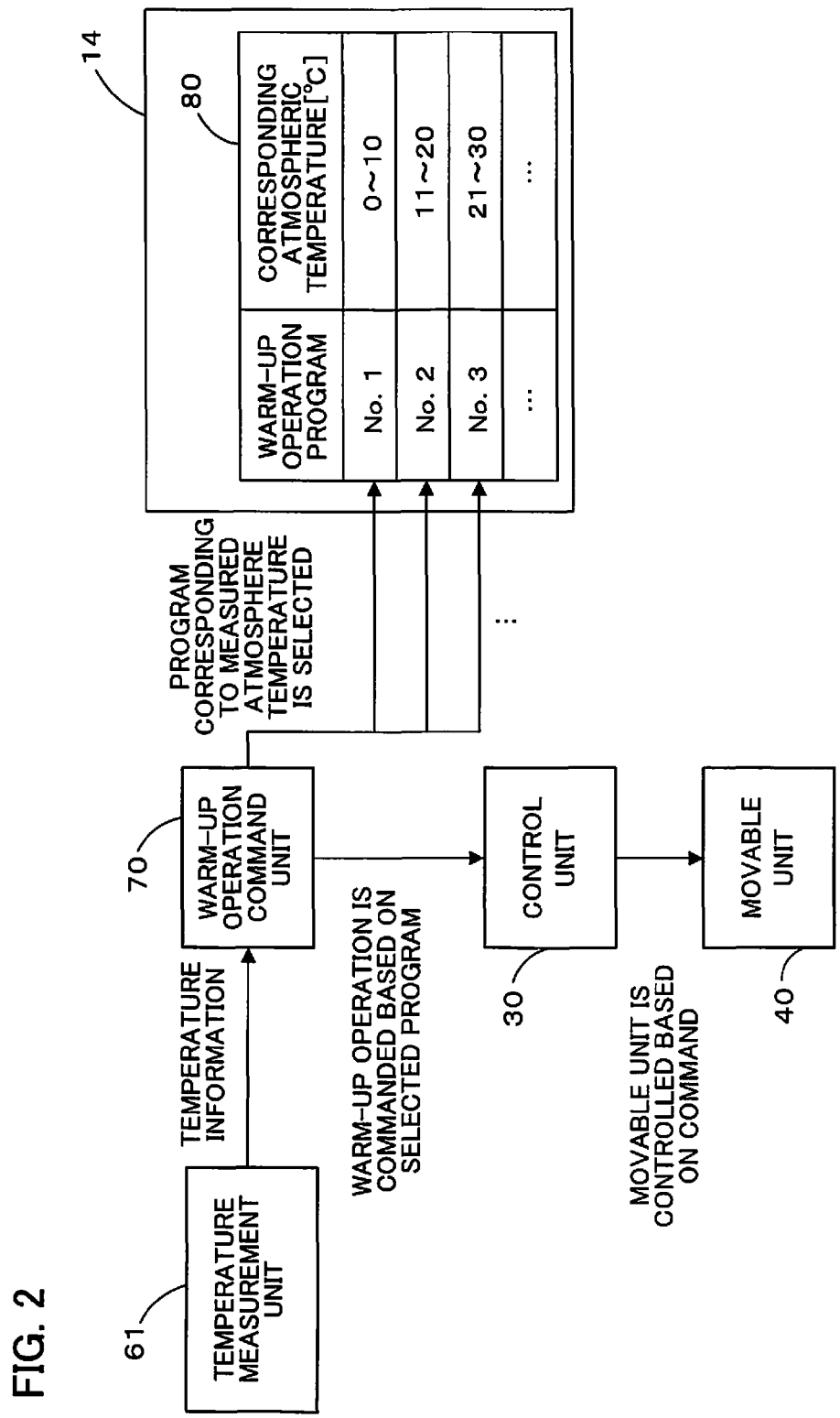
FIG. 2 is a functional block diagram of a first embodiment of the machine tool according to the present invention.
Figure 3:
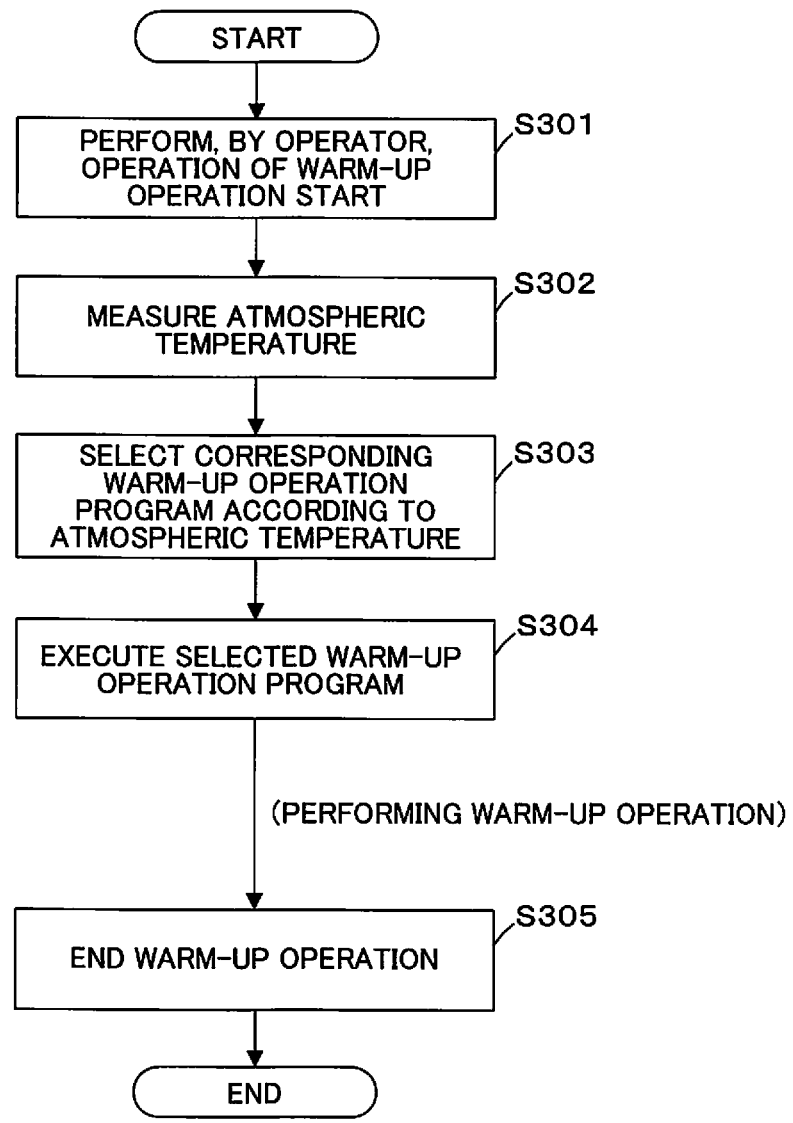
FIG. 3 is a flowchart for explaining processing of executing a warm-up operation program by the machine tool (according to the first embodiment) including functional blocks illustrated in FIG. 2.

First, a first embodiment of the machine tool according to the present invention is described using FIG. 2 and FIG. 3.

FIG. 2 is a functional block diagram of the machine tool 1 according to the first embodiment. This machine tool 1 has the most basic functions of controlling warm-up operation on the basis of an atmospheric temperature. Note that the machine tool 1 uses a temperature measurement unit 61 as one of the sensors 60 in FIG. 1.

The CPU 11 included in the machine tool 1 reads and executes a system program for warm-up operation control stored in the ROM 12, and thereby, operates as a warm-up operation command unit 70. Moreover, as described for FIG. 1, the machine tool 1 includes the control unit 30 including the axis control circuits 31 to 33, the servo amplifiers 35 to 37 and the like, and the movable unit 40 including the motors 41 to 43 and the like. Moreover, in this embodiment, the temperature measurement unit 61 is included as one of the sensors 60 in FIG. 1.

The machine tool 1 stores a plurality of warm-up operation programs in the SRAM 14 of the numerical controller 10. In each warm-up operation program, control of the movable unit 40 is optimized such that warm up can be efficiently performed on the machine tool 1 in a predetermined range of atmospheric temperature. Each warm-up operation program is managed in a warm-up operation program management table 80, associated with parameters indicating the range of the atmospheric temperature in which the warm-up operation program is optimized. For example, in the example illustrated in FIG. 2, a warm-up operation program No. 1 is managed in association with atmospheric temperatures ranging from 0 to 10° C., a warm-up operation program No. 2 is managed in association with atmospheric temperatures ranging from 11 to 20° C., and a warm-up operation program No. 3 is managed in association with atmospheric temperatures ranging from 21 to 30° C.

Processing of executing the warm-up operation program by the machine tool 1 having the functional blocks illustrated in FIG. 2 is described based on a flowchart illustrated in FIG. 3.

When an operator who performs machining of a workpiece using the machine tool 1 manipulates the LCD/MDI unit 50 and instructs the machine tool 1 to start warm-up operation (step S301), the warm-up operation command unit 70 accesses the temperature measurement unit 61 to acquire an atmospheric temperature which is a current temperature around the machine tool 1 as temperature information (step S302). Based on the acquired atmospheric temperature, the warm-up operation command unit 70 refers to the warm-up operation program management table 80 stored in the SRAM 14 to select the warm-up operation program suitable for the current atmospheric temperature (step S303). For example, when the atmospheric temperature measured by the temperature measurement unit 61 is 12° C. in the example of FIG. 2, the warm-up operation command unit 70 refers to the warm-up operation program management table 80 to select the warm-up operation program No. 2.

After the warm-up operation program is selected, the CPU 11 reads and executes the selected warm-up operation program from the SRAM 14, and gives a command of warm-up operation to the control unit 30 according to the instruction of the warm-up operation program (step S304). Then, the control unit 30 operates the movable unit 40 on the basis of the command, and thereby, the warm-up operation is performed. After that, the warm-up operation is continued for a certain period according to the command of the warm-up operation program, and upon the end of the warm-up operation program, the warm-up operation is ended (step S305).

As mentioned above, according to the embodiment, the warm-up operation program is changed based on the atmospheric temperature around the machine tool 1, thereby, for example, driving times of the respective motors or the like are changed, and the warm-up operation can be performed in a control method matching the current atmospheric temperature. Moreover, since the period when the warm-up operation is continued is determined by the selected warm-up operation program, for example, the LCD/MDI unit 50 displays the warm-up operation end time in starting the warm-up operation to inform an operator of the end time, thereby allowing the operator to work out a plan of the work in advance.

Note that, in the above-mentioned embodiment, while an example in which warm-up operation programs are prepared for fixed temperature ranges (every 10° C.) is described, the warm-up operation programs may be prepared for different temperature ranges to match the characteristics of the machine tool 1. Moreover, while the warm-up operation programs are managed in association with the temperature ranges in the table, for example, the warm-up operation program may be selected using a function for deriving the number of the warm-up operation program with the temperature information being an argument. Any technique may be employed as far as an optimum warm-up operation program according to the atmospheric temperature can be selected.

Figure 4:
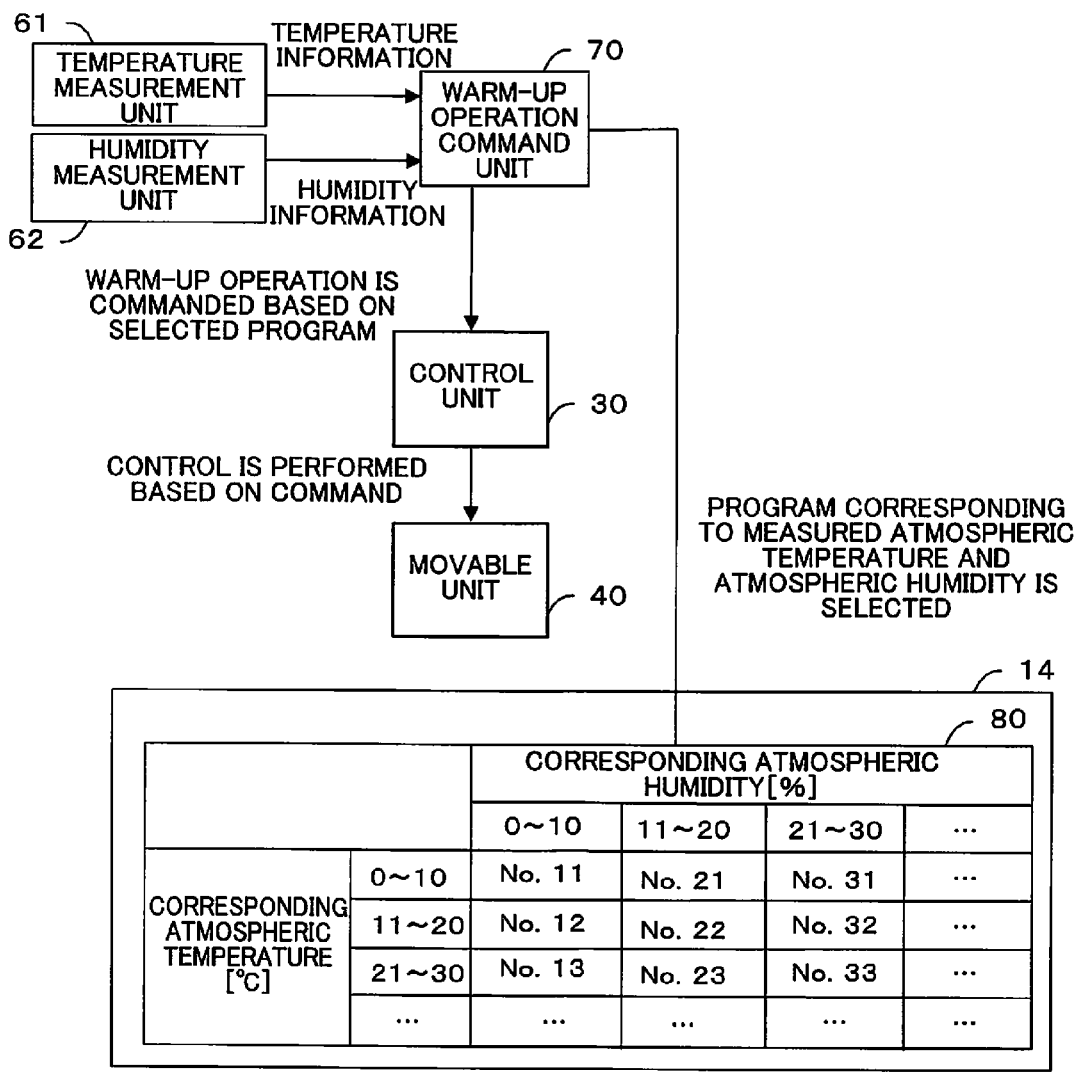
FIG. 4 is a functional block diagram of a second embodiment of the machine tool according to the present invention.
Figure 5:
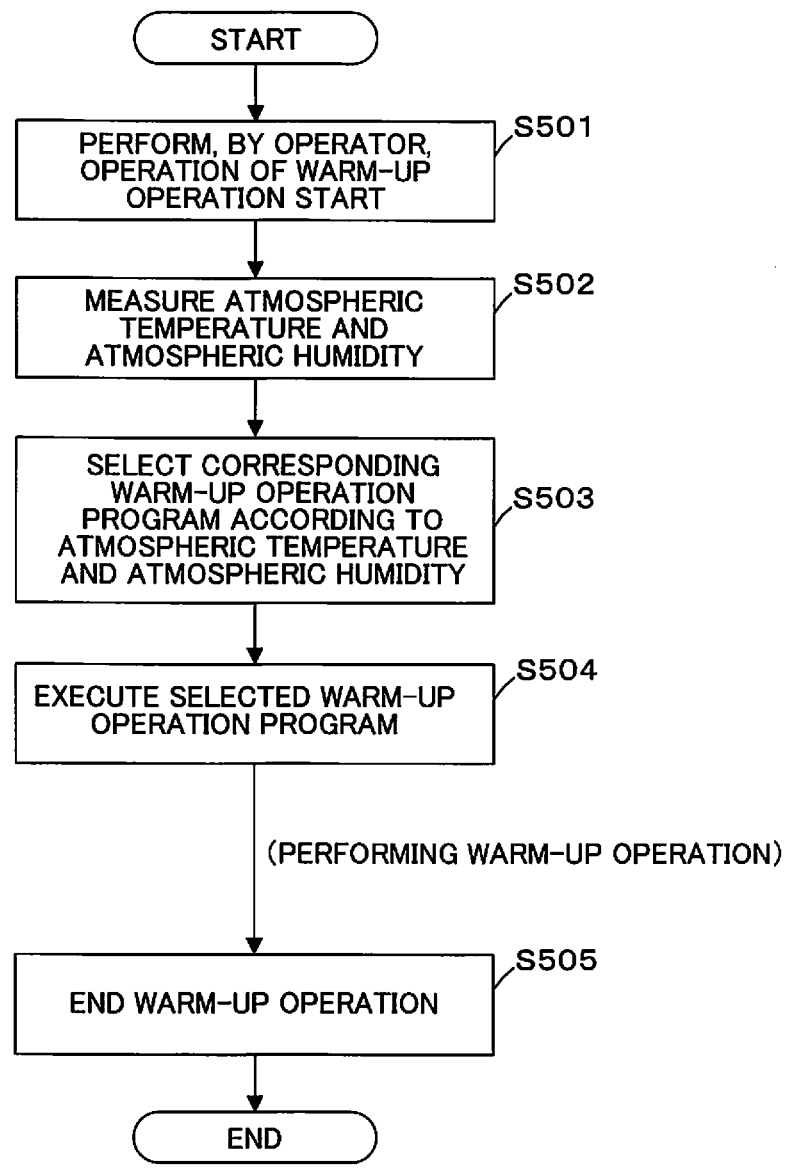
FIG. 5 is a flowchart for explaining processing of executing the warm-up operation program by the machine tool (according to the second embodiment) including functional blocks illustrated in FIG. 4.

Next, a second embodiment of the machine tool according to the present invention is described using FIG. 4 and FIG. 5.

While, in the above-mentioned first embodiment, warm-up operation is controlled based on an atmospheric temperature, in this embodiment, an atmospheric humidity is measured as well as the atmospheric temperature, and the warm-up operation is controlled based on the results of the measurements.

FIG. 4 is a functional block diagram of the machine tool 1 according to the second embodiment. This machine tool 1 uses a humidity measurement unit 62 as well as the temperature measurement unit 61 as the sensors 60 in FIG. 1.

The machine tool 1 manages a plurality of warm-up operation programs in association with both ranges of the atmospheric temperature and ranges of the atmospheric humidity. In each warm-up operation program, control of the movable unit 40 is optimized such that warm up can be efficiently performed on the machine tool 1 in a predetermined range of the atmospheric temperature and in a predetermined range of the atmospheric humidity. Each warm-up operation program is managed in the warm-up operation program management table 80 which is configured to be a two-dimensional table, associated with parameters indicating the range of the atmospheric temperature and the range of the atmospheric humidity in which the warm-up operation program is optimized. For example, in the example illustrated in FIG. 4, a warm-up operation program No. 11 is managed in association with atmospheric temperature ranging from 0 to 10° C. and atmospheric humidity ranging from 0 to 10%, a warm-up operation program No. 21 is managed in association with atmospheric temperature ranging from 0 to 10° C. and atmospheric humidity ranging from 11 to 20%, a warm-up operation program No. 12 is managed in association with atmospheric temperature ranging from 11 to 20° C. and atmospheric humidity ranging from 0 to 10%, and so on.

Processing of executing the warm-up operation program by the machine tool 1 having the functional blocks illustrated in FIG. 4 is described based on a flowchart illustrated in FIG. 5.

When an operator who performs machining of a workpiece using the machine tool 1 manipulates the LCD/MDI unit 50 and instructs the machine tool 1 to start the warm-up operation (step S501), the warm-up operation command unit 70 accesses the temperature measurement unit 61 and the humidity measurement unit 62 to acquire the atmospheric temperature which is the current temperature around the machine tool 1 and the atmospheric humidity which is the current humidity around the machine tool 1 as the temperature information and the humidity information (step S502). Based on the acquired atmospheric temperature and atmospheric humidity, the warm-up operation command unit 70 refers to the warm-up operation program management table 80 stored in the SRAM 14 to select the warm-up operation program suitable for the current atmospheric temperature and the current atmospheric humidity (step S503). For example, when the atmospheric temperature measured by the temperature measurement unit 61 is 12° C. and the atmospheric humidity measured by the humidity measurement unit 62 is 25% in the example of FIG. 4, the warm-up operation command unit 70 refers to the warm-up operation program management table 80 to select the warm-up operation program No. 32.

After the warm-up operation program is selected, the CPU 11 reads and executes the selected warm-up operation program from the SRAM 14, and gives the command of warm-up operation to the control unit 30 according to the instruction of the warm-up operation program (step S504). Then, the control unit 30 operates the movable unit 40 on the basis of the command, and thereby, the warm-up operation is performed. After that, the warm-up operation is continued for a certain period according to the command of the warm-up operation program, and upon the end of the warm-up operation program, the warm-up operation is ended (step S505).

As mentioned above, according to the embodiment, the warm-up operation program is changed based on the atmospheric temperature and the atmospheric humidity around the machine tool 1, thereby, for example, the driving times of the respective motors or the like are changed, and the warm-up operation can be performed in a control method matching the current atmospheric temperature and atmospheric humidity. Moreover, since the period when the warm-up operation is continued is determined by the selected warm-up operation program, for example, the LCD/MDI unit 50 displays the warm-up operation end time in starting the warm-up operation to inform an operator of the end time, thereby allowing the operator to work out a plan of the work in advance.

Note that, in the above-mentioned embodiment, while an example in which warm-up operation programs are prepared for fixed temperature ranges (every 10° C.) and fixed humidity ranges (every 10%) is described, the warm-up operation programs may be prepared for different temperature ranges and different humidity ranges to match the characteristics of the machine tool 1. Moreover, while the warm-up operation programs are managed in association with the temperature ranges and the humidity ranges in the table, for example, the warm-up operation program may be selected using a function for deriving the number of the warm-up operation program with the temperature information and the humidity information being arguments. Any technique may be employed as far as an optimum warm-up operation program according to the atmospheric temperature and the atmospheric humidity can be selected.

Figure 6:
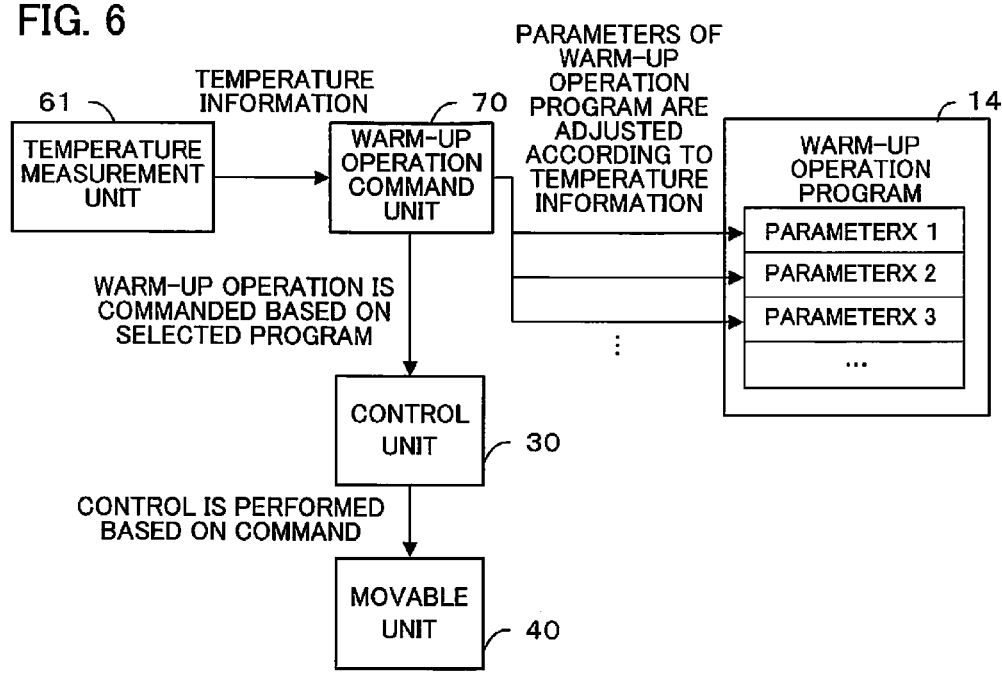
FIG. 6 is a functional block diagram of a third embodiment of the machine tool according to the present invention.
Figure 7:
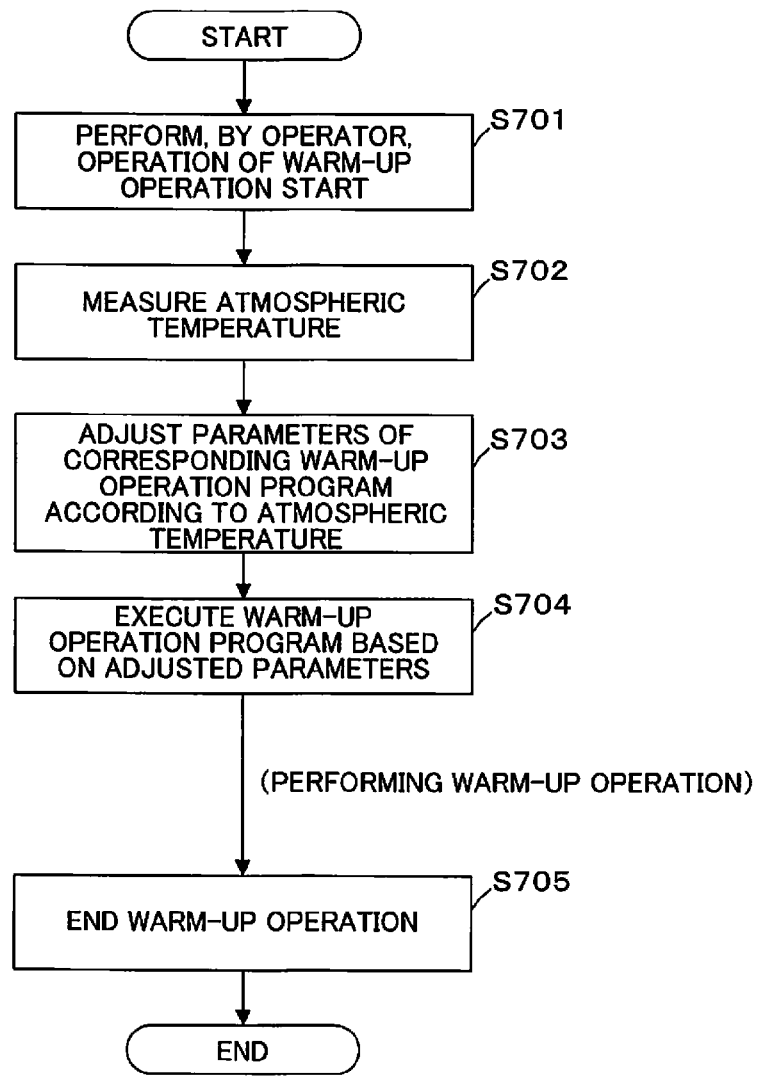
FIG. 7 is a flowchart for explaining processing of executing the warm-up operation program by the machine tool (according to the third embodiment) including functional blocks illustrated in FIG. 6.

Next, a third embodiment of the machine tool according to the present invention is described using FIG. 6 and FIG. 7.

While, in the above-mentioned first embodiment, the warm-up operation program is selected based on the atmospheric temperature, in this embodiment, parameters of the warm-up operation program are adjusted based on the atmospheric temperature to control the warm-up operation.

FIG. 6 is a functional block diagram of the machine tool 1 according to the third embodiment. This machine tool 1 is largely different from the above-mentioned machine tool 1 according to the first embodiment in that the warm-up operation program stored in the SRAM 14 (FIG. 1) has a plurality of parameters and the warm-up operation command unit 70 is configured to be able to adjust the values of the parameters.

For the machine tool 1, a plurality of adjustable parameters are provided in the warm-up operation program. The parameters provided in the warm-up operation program are used for determining a driving time or the like of the movable unit 40, controlled by the warm-up operation program in warm-up operation, by the respective motors. The program is configured such that operation control of the warm-up operation by the warm-up operation program is changed according to the values set to the parameters. When the warm-up operation command unit 70 obtains the parameter values from the atmospheric temperature, for example, it may be configured to refer to a parameter setting table (not shown) in which the ranges of the atmospheric temperature are defined in association with the values of the parameters or to obtain the parameter values with functions with the temperature information being an argument. Any technique may be employed as far as optimum adjustment of the warm-up operation program can be performed according to the atmospheric temperature.

Processing of executing the warm-up operation program by the machine tool 1 having the functional blocks illustrated in FIG. 6 is described based on a flowchart illustrated in FIG. 7.

When an operator who performs machining of a workpiece using the machine tool 1 manipulates the LCD/MDI unit 50 and instructs the machine tool 1 to start the warm-up operation (step S701), the warm-up operation command unit 70 accesses the temperature measurement unit 61 to acquire the atmospheric temperature which is the current temperature around the machine tool 1 as the temperature information (step S702). Based on the acquired atmospheric temperature, the warm-up operation command unit 70 adjusts the parameter values of the warm-up operation program stored in the SRAM 14 (step S703).

After the parameters of the warm-up operation program are adjusted, the CPU 11 reads and executes the adjusted warm-up operation program from the SRAM 14, and gives the command of warm-up operation to the control unit 30 according to the instruction of the warm-up operation program (step S704). Then, the control unit 30 operates the movable unit 40 on the basis of the command, and thereby, the warm-up operation is performed. After that, the warm-up operation is continued for a certain period according to the command of the warm-up operation program, and upon the end of the warm-up operation program, the warm-up operation is ended (step S705).

As mentioned above, according to the embodiment, the parameters of the warm-up operation program are adjusted based on the atmospheric temperature around the machine tool 1, and thereby, for example, the driving times of the respective motors in warm-up operation can be adjusted so as to match the current atmospheric temperature. Moreover, since the parameters which are set determine the period when the warm-up operation is continued by the warm-up operation program, for example, the LCD/MDI unit 50 displays the warm-up operation end time in starting the warm-up operation to inform an operator of the end time, thereby allowing the operator to work out a plan of the work in advance.

Figure 8:
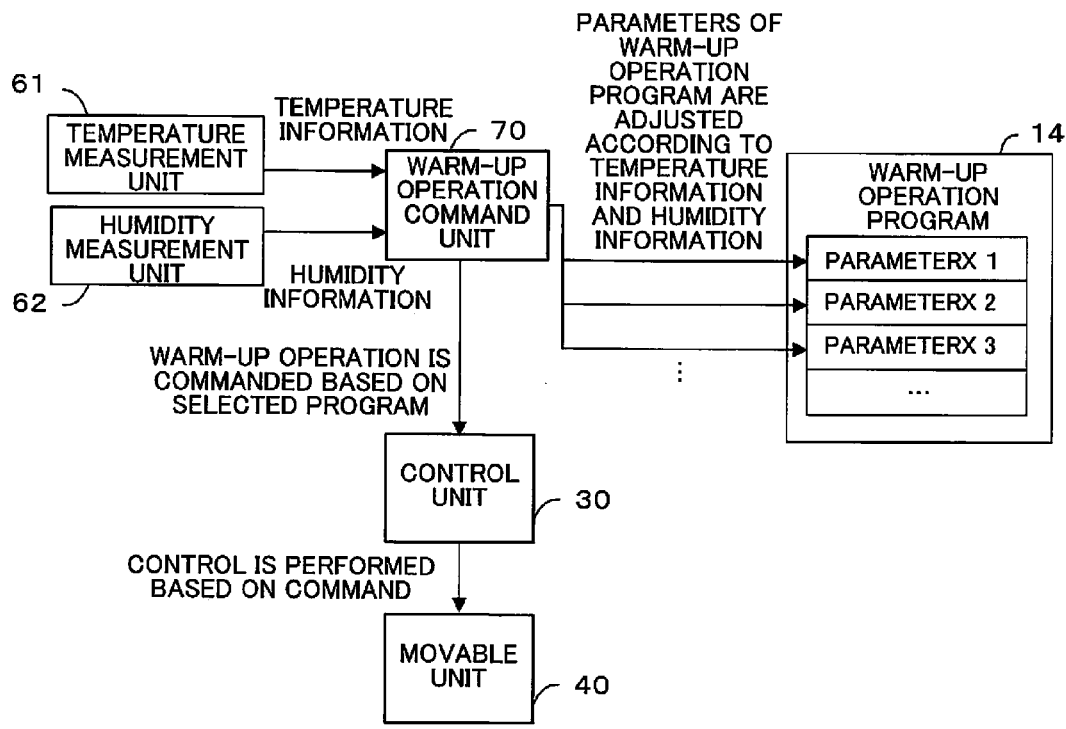
FIG. 8 is a functional block diagram of a fourth embodiment of the machine tool according to the present invention.
Figure 9:
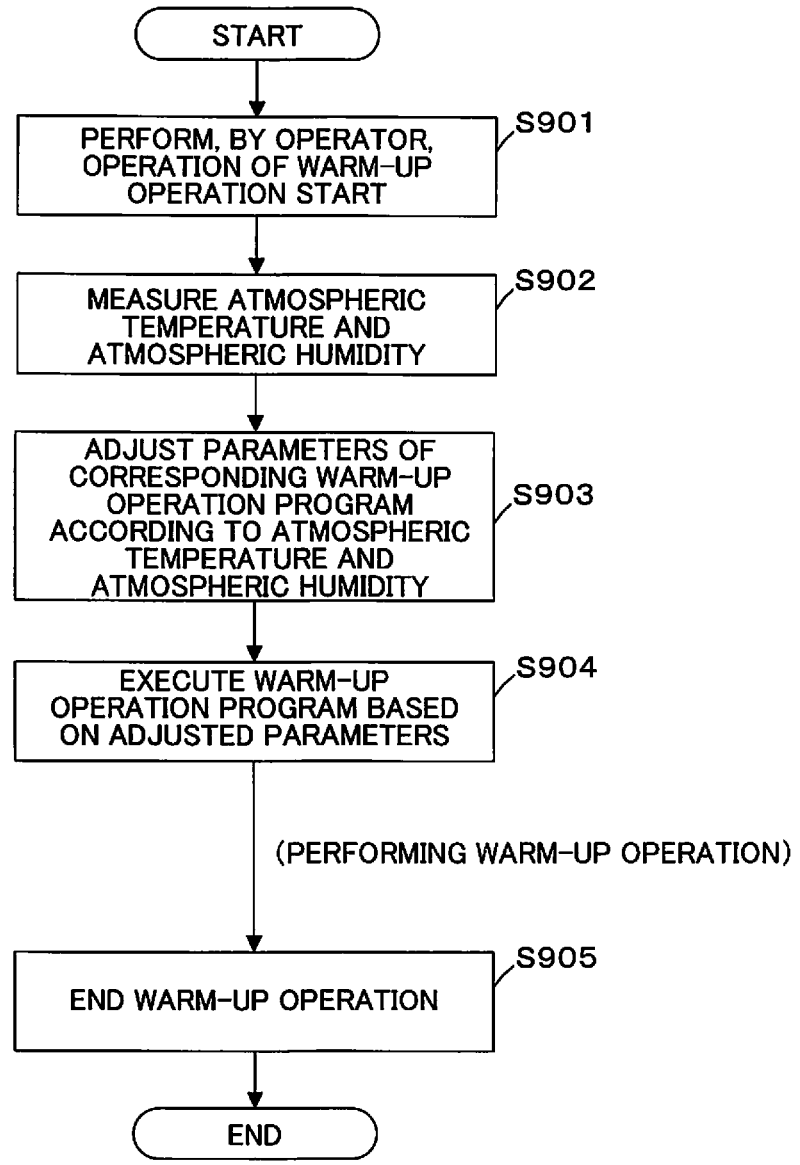
FIG. 9 is a flowchart for explaining processing of executing the warm-up operation program by the machine tool (according to the fourth embodiment) including functional blocks illustrated in FIG. 8.

Next, a fourth embodiment of the machine tool according to the present invention is described using FIG. 8 and FIG. 9.

While, in the above-mentioned third embodiment, the parameters of the warm-up operation program are adjusted based on the atmospheric temperature, in this embodiment, the atmospheric humidity is measured as well as the atmospheric temperature, and the parameters of the warm-up operation program are adjusted based on the results of the measurements.

FIG. 8 is a functional block diagram of the machine tool 1 according to the fourth embodiment. This machine tool 1 uses the humidity measurement unit 62 as well as the temperature measurement unit 61 as the sensors 60 in FIG. 1.

Similarly to the above-mentioned third embodiment, in the warm-up operation program used for this machine tool 1, various parameters defining operation of the movable unit 40 controlled by the warm-up operation program in warm-up operation are set. The program is configured such that control of the warm-up operation by the warm-up operation program is changed according to the values set to the parameters. When the warm-up operation command unit 70 obtains the parameter values from the atmospheric temperature and the atmospheric humidity, for example, it may be configured to refer to a parameter setting table (not shown) in which the ranges of the atmospheric temperature and the ranges of the atmospheric humidity are defined in association with the values of the parameters or to obtain the parameter values with functions with the temperature information and the humidity information being arguments. Any technique may be employed as far as optimum adjustment of the warm-up operation program can be performed according to the atmospheric temperature and the atmospheric humidity.

Processing of executing the warm-up operation program by the machine tool 1 having the functional blocks illustrated in FIG. 8 is described based on a flowchart illustrated in FIG. 9.

When an operator who performs machining of a workpiece using the machine tool 1 manipulates the LCD/MDI unit 50 and instruct the machine tool 1 to start the warm-up operation (step S901), the warm-up operation command unit 70 accesses the temperature measurement unit 61 and the humidity measurement unit 62 to acquire the atmospheric temperature which is the current temperature around the machine tool 1 and the atmospheric humidity which is the current humidity around the machine tool 1 as the temperature information and the humidity information, respectively (step S902). Based on the acquired atmospheric temperature and atmospheric humidity, the warm-up operation command unit 70 adjusts the parameter values of the warm-up operation program stored in the SRAM 14 (step S903).

After the parameters of the warm-up operation program are adjusted, the CPU 11 reads and executes the adjusted warm-up operation program from the SRAM 14, and gives the command of warm-up operation to the control unit 30 according to the instruction of the warm-up operation program (step S904). Then, the control unit 30 operates the movable unit 40 on the basis of the command, and thereby, the warm-up operation is performed. After that, the warm-up operation is continued for a certain period according to the command of the warm-up operation program, and upon the end of the warm-up operation program, the warm-up operation is ended (step S905).

As mentioned above, according to the embodiment, the parameters of the warm-up operation program are adjusted based on the atmospheric temperature and the atmospheric humidity around the machine tool 1, and thereby, for example, the driving times of the respective motors in warm-up operation can be adjusted so as to match the current atmospheric temperature and atmospheric humidity. Moreover, since the parameters which are set determine the period when the warm-up operation is continued by the warm-up operation program, for example, the LCD/MDI unit 50 displays the warm-up operation end time in starting the warm-up operation to inform an operator of the end time, thereby allowing the operator to work out a plan of the work in advance.

Figure 10:
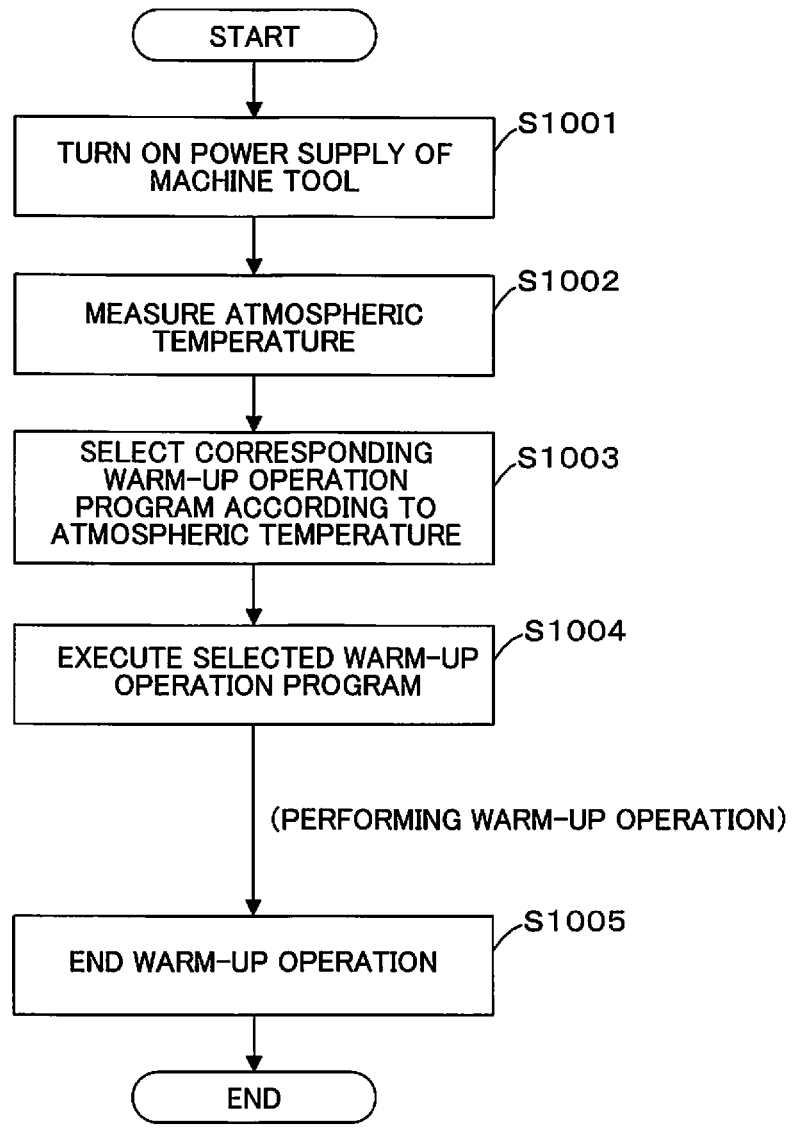
FIG. 10 is a flowchart for explaining processing of executing the warm-up operation program by a fifth embodiment of the machine tool according to the present invention.

Next, a flow of processing of executing the warm-up operation program according to a fifth embodiment of the machine tool according to the present invention is described using a flowchart in FIG. 10.

While, in the above-mentioned embodiments, examples in which the warm-up operation command unit 70 receives the command to start the warm-up operation from an operator, and acquires the atmospheric temperature is acquired are presented, in this embodiment, the machine tool is configured to automatically start a warm-up operation when power supply to the machine tool is performed.

Note that, the functional blocks of the machine tool 1 according to the embodiment are the same as those in FIG. 2 (Embodiment 1).

When an operator who performs machining of a workpiece using the machine tool 1 turns on power supply of the machine tool 1 (step S1001), the warm-up operation command unit 70 automatically accesses the temperature measurement unit 61 to acquire the atmospheric temperature which is the current temperature around the machine tool 1 as the temperature information (step S1002). The warm-up operation command unit 70 refers to the warm-up operation program management table 80 stored in the SRAM 14 on the basis of the acquired atmospheric temperature to select the warm-up operation program suitable for the current atmospheric temperature (step S1003).

After the warm-up operation program is selected, the CPU 11 reads and executes the selected warm-up operation program from the SRAM 14, and gives the command of warm-up operation to the control unit 30 according to the instruction of the warm-up operation program (step S1004). Then, the control unit 30 operates the movable unit 40, and thereby, the warm-up operation is performed. After that, the warm-up operation is continued, and upon the end of the selected warm-up operation program, the warm-up operation is ended (step S1005).

As mentioned above, according to the embodiment, when the machine tool 1 is activated, the optimum warm-up operation program is automatically selected based on the atmospheric temperature. Accordingly, an operator can omit operation of instructing the warm-up operation.

Note that, also in any of the embodiments other than the fifth embodiment, the warm-up operation can be configured to be automatically started in activating the machine tool 1, and thereby, the effect similarly to that in the fifth embodiment can be obtained.

What is claimed is:

1. A machine tool having a warming-up function of driving a movable unit of the machine tool to perform warm up, the machine tool comprising:
    a control unit that controls the movable unit;
    a temperature measurement unit that measures an atmospheric temperature around the machine tool;
    a program storage unit that stores a plurality of warm-up operation programs in association with the atmospheric temperature;
    a warm-up operation command unit that selects one warm-up operation program from among the warm-up operation programs stored in the program storage unit on the basis of the atmospheric temperature measured by the temperature measurement unit, and gives a command of warm-up operation to the control unit on the basis of the selected warm-up operation program; and
    a humidity measurement unit that measures an atmospheric humidity around the machine tool, wherein
    the control unit controls the movable unit on the basis of the command from the warm-up operation command unit,
    the program storage unit stores the plurality of warm-up operation programs in association with the atmospheric temperature and the atmospheric humidity, and
    the warm-up operation command unit is configured to select the warm-up operation program from among the warm-up operation programs stored in the program storage unit on the basis of the atmospheric temperature measured by the temperature measurement unit and the atmospheric humidity measured by the humidity measurement unit.

2. The machine tool according having a warming-up function, according to claim 1, wherein
    the temperature measurement unit is configured to automatically start to measure the atmospheric temperature when power supply to the machine tool is performed.

3. The machine tool having a warming-up function according to claim 1, wherein
    the temperature measurement unit and the humidity measurement unit are configured to automatically start to measure the atmospheric temperature and the atmospheric humidity, respectively, when power supply to the machine tool is performed.

4. A machine tool having a warming-up function of driving a movable unit of the machine tool to perform warm up, the machine tool comprising:
    a control unit that controls the movable unit;
    a temperature measurement unit that measures an atmospheric temperature around the machine tool;
    a program storage unit that stores a warm-up operation program including a parameter that can change a warm-up operation period; and
    a warm-up operation command unit that changes the parameter on the basis of the atmospheric temperature measured by the temperature measurement unit, and gives a command of warm-up operation to the control unit on the basis of the warm-up operation program in which the parameter is changed; and
    a humidity measurement unit that measures an atmospheric humidity around the machine tool, wherein
    the control unit controls the movable unit on the basis of the command from the warm-up operation command unit, and
    the warm-up operation command unit is configured to change the parameter on the basis of the atmospheric temperature measured by the temperature measurement unit, and the atmospheric humidity measured by the humidity measurement unit.

5. The machine tool according having a warming-up function, according to claim 4, wherein
    the temperature measurement unit is configured to automatically start to measure the atmospheric temperature when power supply to the machine tool is performed.

6. The machine tool having a warming-up function according to claim 4, wherein
    the temperature measurement unit and the humidity measurement unit are configured to automatically start to measure the atmospheric temperature and the atmospheric humidity, respectively, when power supply to the machine tool is performed.

\* \* \* \* \*